Figure 1:
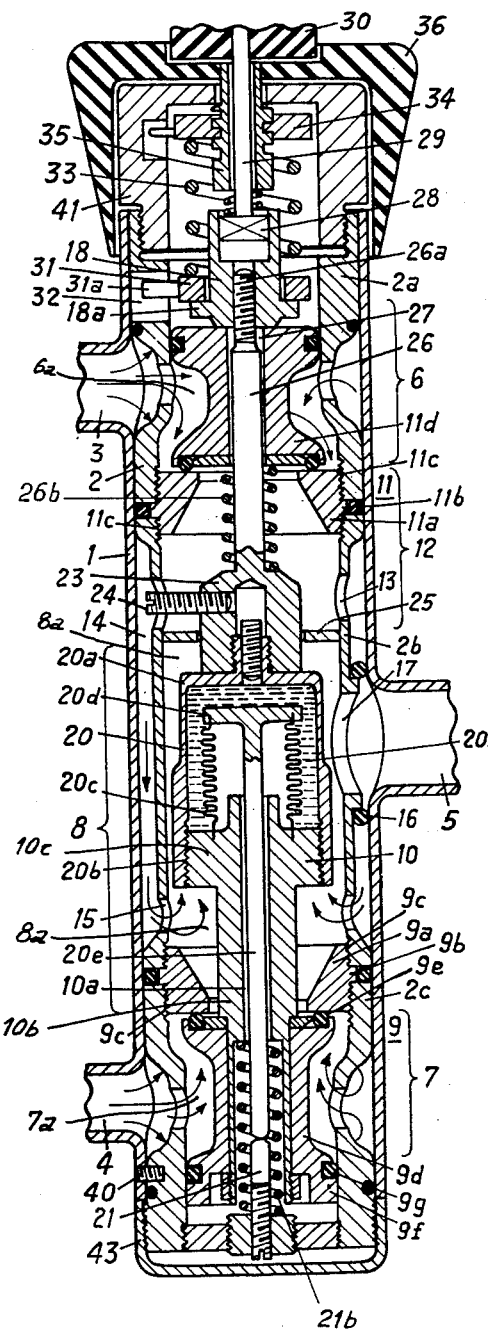

Dec. 3, 1963   R. KILLIAS   3,112,879
MIXING VALVE
Filed Jan. 18, 1962

INVENTOR.
Rudolf Killias
BY Werner W. Kleeman
ATTORNEY

United States Patent Office 3,112,879
Patented Dec. 3, 1963

3,112,879
MIXING VALVE
Rudolf Killias, Gossau, Zurich, Switzerland, assignor to Albert Lins, Zurich, Switzerland
Filed Jan. 18, 1962, Ser. No. 167,027
Claims priority, application Switzerland Feb. 1, 1961
15 Claims. (Cl. 236—12)

The present invention relates to a thermal mixing valve by means of which the temperature of mixed fluid mediums, for example, composed from a stream of cold water and hot water, can be maintained at a regulatable value through automatic control of the mixing ratio.

Mixing valves of this type generally consist of a hot water chamber, mixing chamber and a cold water chamber whereby the hot water chamber and the cold water chamber are each connected through the intermediary of a valve with the mixing chamber, and in the mixing chamber there is provided a temperature feeler for controlling the valves passed by the mass of mixed water. In the construction of a mixing valve of the previously mentioned type, it has been shown that errors in the temperature control have arisen. Experimental tests have indicated that such errors have been influenced by the absolute temperature of hot water. As a practical matter, this means that the desired preset value of the temperature of the mixed water cannot be obtained, and more often, the actual temperature of the mixed water lies beneath the desired preset value an amount which is a function of the temperature of the hot water. Such a deviation from the desired temperature value, which appears in different instances in various mixing valve constructions, oftentimes amounts to as much as a 20° C. error in temperature, and can be attributed to the fact that the hot water directly influences the temperature feeler through the intermediary of metallic parts which serve to support said temperature feeler.

In a further known construction, it has been determined that an opposite effect occurs. In this case, the temperature of the mixed water lies above the preset value since the metallic parts for supporting the temperature feeler are, in the first instance, influenced by the cold water. Also, in this case, it is not possible to provide for an exact control of the temperature of the mixed water.

Accordingly, it is a primary object of the present invention to provide a mixing valve by means of which the temperature of mixed fluid mediums, such as hot and cold water, can be regulated with a high degree of accuracy.

A further important object of the present invention is the provision of a mixing valve of the type described wherein the control function of the temperature feeler is influenced by the mixed water.

Another important object of the present invention is the provision of an improved mixing valve structure capable of achieving a desired preset temperature of a commingled fluid mass with a high degree of accuracy.

Still another important object of the present invention is to provide an improved mixing valve which is highly reliable in operation, economical to manufacture, and relatively simple to assemble and disassemble.

Yet a further important object of the present invention is to provide an improved mixing valve of the type having a temperature feeler wherein undesired foreign temperatures do not effect the temperature feeler or its support elements, so that a high sensitivity of temperature control prevails.

In a preferred manifestation of the present invention, the mixing valve is characterized by the fact that the elements provided for supporting the temperature feeler are at least partially passed by the mixed water. As a result of this measure, the support means for the temperature feeler is also maintained at the same temperature as the temperature feeler itself, so that there does not appear an undesired foreign temperature source which could adversely influence the control signal delivered by the temperature feeler.

Thus, there is provided a mixing valve assembly for mixing together hot and cold water and automatically controlling the temperature of the outgoing mixed water. This valve assembly includes wall means defining a hot water chamber, a cold water chamber and a mixing chamber, as well as valve means arranged in said hot water chamber and said cold water chamber for controlling the delivery of hot and cold water to said mixing chamber. Temperature responsive means are arranged in said mixing chamber, said temperature responsive means cooperating with said valve means to control the latter. A support member is provided for said temperature responsive means, and said mixing chamber is provided with inlet openings for admitting said hot and cold water into said mixing chamber at a point remote from said temperature responsive means and such that at least a portion of said support means for said temperature responsive means is passed and contacted by the mixed water. Additionally, an improved sealing arrangement is provided for the movable parts of the valve assembly, so that for all practical purposes there results a practically resistance free movement of the movable system.

Still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

Figure 2:
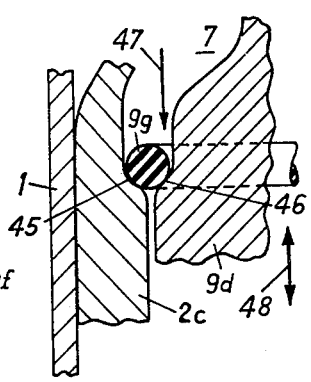

In the drawings:
FIGURE 1 is a longitudinal, cross-sectional view taken through a mixing valve designed according to the teachings of the present invention; and
FIGURE 2 is a fragmentary, enlarged cross-sectional view showing a detail of the mixing valve illustrated in FIGURE 1.

Referring now to the drawings and, more particularly to FIGURE 1 thereof, there is shown a mixing valve construction which in the illustrated embodiment consists of an outer hollow housing 1 and, for example, a sectional tripartite, inner sleeve housing 2, with the three individual hollow sleeve portions of the inner housing being denoted by the reference numerals 2a, 2b and 2c. It will be appreciated that the upper housing portion 2a, intermediate housing portion 2b and lower housing portion 2c, are preferably coaxially arranged within the hollow outer housing 1. The outer housing 1 is provided with a cold water inlet feed pipe 3, a hot water inlet feed pipe 4 and a mixed water delivery or outlet pipe 5. The cold water feed pipe 3 communicates with a cold water zone 6 including a cold water compartment or chamber 6a and the hot water feed pipe 4 communicates with a hot water zone 7 including a hot water chamber or compartment 7a.

Between these two zones 6, 7 there is disposed the mixing zone 8 including the mixing chamber 8a, which mixing chamber is arranged within the inner, intermediate housing sleeve portion 2b and is in registry with the mixed water delivery pipe 5. The hot water chamber 7a is connected with the mixing chamber 8a through the intermediary of a valve generally denoted by reference numeral 9. The hot water valve 9 is composed of a valve seat 9a provided with a valve opening and which exhibits a radially outwardly extending projection 9b located between the intermediate housing portion 2b and the lower housing portion 2c of the inner housing 2. Additionally, the valve seat 9a is rotatably guided in the inner housing portions 2b and 2c, as indicated by the threaded portion 9c for example.

The hot water valve 9 further consists of a movable valve member 9d which, as shown, is secured to a shaft portion 10b of a transmission member 10 and can be moved together in the axial direction with this transmission member. Between the opposed surfaces of the valve seat 9a and the movable valve member 9d there is clamped a sealing member such as an O-ring 9e for example, which in the closed position of the valve member 9 lies against the valve seat 9a and interrupts flow through the valve opening between the hot water chamber 7a and the mixing chamber 8a.

The other end 9f of the movable valve member 9d opposite the valve seat 9a possesses a diameter which at least approximately equals the diameter of the end of the valve member 9d which is directly opposite the valve seat 9a. The end 9f of the movable valve member 9d is sealed against the inner housing member 2c by an O-ring 9g. In view of the uniformity of the diameter of the respective end portions of the movable valve member 9d, it is possible to ensure that the pressure appearing in the hot water compartment 7a does not cause an axial displacement of the movable valve member 9d. It is to be appreciated that all forces resulting from the pressure of the hot water compensate one another in the axial direction of the valve member 9d. Consequently, the position of the valve member 9d is independent of the pressure of the hot water. Since, as will be more fully explained hereinafter, the position of the hot water valve member 9d, and subsequently to be described cold water valve 11, influence the mixing ratio of the hot and cold water, the previously mentioned pressure compensation is significant insofar as the temperature of the mixed water is not dependent upon the pressure of the hot water or of the cold water.

An essentially similar cold water valve construction generally designated by reference numeral 11, and likewise constructed to compensate forces resulting in the axial direction, is also provided in the cold water compartment 6a. A movable valve member 11d cooperates with a valve seat 11a having a valve opening, whereby the valve seat 11a is provided with a radially outward extending projection 11b against which bears the inner housing portions 2a and 2b. The valve seat 11a is also rotatably connected with the inner housing portions 2a and 2b, as generally indicated by reference numeral 11c. The cold water chamber 6a communicates with an intermediate chamber or compartment 12 into which the cold water is next admitted when the cold water valve construction, generally designated by reference numeral 11, for the cold water chamber 6a is opened. The intermediate cold water chamber 12 communicates with an annular chamber 14 formed between the outer wall of the intermediate, inner housing portion 2b and the inner wall of the outer housing 1 through the intermediary of several openings or ports 13 provided in the wall of said intermediate housing sleeve portion 2b.

This annular or ring-shaped channel or compartment 14 conducts the cold water to the mixing chamber 8a arranged internally of the inner housing portion 2b. For this purpose, there is shown in the illustrated embodiment, a plurality of openings or ports 15 remote from a temperature responsive member or feeler 20 provided directly above the valve seat 9a, and by means of which the cold water present in the annular channel 14 can be admitted into the mixing chamber 8a. In order to prevent that the cold water appearing in the annular chamber 14 will flow directly to the delivery pipe 5 for the mixed water, the inlet mouth of this delivery pipe 5 is surrounded by an O-ring 16 which abuts against the inner housing portion 2b and, in turn, encompasses an opening or port 17 provided in this housing portion. The port 17 provides communication between the mixing chamber 8a and the delivery pipe 5 for the outgoing mixed water.

In the mixing chamber 8a, which is separated from the intermediate cold water chamber 12 by means of a wall 25 connected with the inner housing 2, there is arranged the temperature feeler, generally designated by reference numeral 20. The temperature feeler 20 consists of a temperature feeler housing 20a, which as indicated by reference numeral 20b, is threadably connected with the upper portion 10c of the transmission member 10. Within the feeler housing 20a there is arranged an expansible bellows 20c for example, and which in the illustrated embodiment is shown connected at its lower end with said upper portion 10c of the transmission member 10 and at its upper end with a piston or plate member 20d. The plate member 20d is connected to a pressure rod or plunger 20e extending through an axial bore 10a provided for the transmission member 10. The lower end of the pressure rod 20e rests against an abutment support member 21, the axial position of which may be adjusted. By altering the axial position of the abutment support member 21, or preferably by changing the initial stress or bias of a compensation spring 21b which encompasses the abutment member, it is possible to achieve a fine or sensitive control of the temperature, that is to say, an adjustment of a temperature control member in accordance with a predetermined scale, as will be more fully described hereinafter.

The space between the expansible bellows 20c and the temperature feeler housing 20a is filled with a control medium, as generally indicated by reference numeral 20f. This control medium is preferably a material which remains in the saturated vapor state throughout the entire operating temperature range, as for example halogen-substituted hydrocarbons. Materials of this type can be commercially acquired under the name "Freon." With increased temperature, a more or less larger portion of the fluid phase of the control medium vaporizes, which results in an increased pressure. Since, the piston or plate member 22 supports itself via the pressure rod 20d, and thereby is not able to carry out a displacement in the axial direction, the feeler housing 20a in the illustrated embodiment moves upwardly. With the upward movement of the feeler housing 20a there is tied in a corresponding upward movement of the movable valve members 9d and 11d. By virtue of this upward movement of the movable valve members 9d and 11d, the supply of hot water is throttled and the supply of cold water is increased, with a resulting decrease in temperature of the mixed water.

As will be clearly evident by reference to the drawing, the temperature feeler housing 20a and upper portion 10c of transmission member 10 are passed on their outer surface by the mixed water, and for this reason the temperature within said temperature feeler housing, more specifically, the temperature of the control medium, is influenced by the mixed water. Additionally, the feeler housing 20a is connected with the upper portion 10c of the supporting transmission member 10 so that the temperature of this upper portion 10c also influences the temperature of the control medium located within the feeler housing 20a. If, now, as is the case with heretofore known mixing valve constructions, the support for the temperature feeler, which in the present case is the transmission member 10, is only passed or washed by the hot water, then the control medium 20f is not only influenced by the mixed water but also by the hot water. It is for this reason that one can account for the very strongly pronounced temperature variations between the actual temperature of the mixed water and the desired preset mixed water temperature.

In the illustrated embodiment of the invention, mixing of the hot water and the cold water already takes place in that portion of the mixing chamber 8a which is arranged outside of or remote from the uper portion 10c of the transmission member 10. The incoming cold water from the annular shaped chanel 14 flows into the inner space of the intermediate, inner housing portion 2b through the ports 15 and directly mixes therein with the stream of hot water coming from the hot water chamber 7a, so that only the mixed water works directly upon the transmission member 10, or at least those portions thereof which can thermally influence the control medium. In such a manner it is possible to reliably avoid that the hot water or cold water will influence the temperature feeler 20.

In order to regulate the total quantity of water delivered from the mixing valve assembly it is possible to alter the distance between the two movable valve members 9d and 11d. For this purpose, there is threadably connected to the temperature feeling housing 20a a body or block member 23 which is secured against rotation by means of the screw member 24. A pull rod 26 communicates with the body member 23 and extends through an axial bore 27 provided in the movable valve member 11d. The upper end of the pull rod 26 is shown provided with a threaded portion 26a which is connected with a nut member 18. The nut member 18 is rotatably connected to a square shaft 28 whereby, however, a relative movement between the nut member 18 and the square shaft 28 is possible in the axial direction. A regulating control knob 30 for the total water quantity is connected to the square shaft 28 through the intermediary of a rod 29.

When the control knob 30 is turned, the nut 18 rotates in the same rotational sense and upwardly pulls the threads 26a of the pull rod 26. As a result, a spring member 26b is compressed, which spring 26b is arranged to press the movable valve member 11d against the bottom surface of the nut 18, and strives to separate the valve members 9d and 11d from one another. Since, as is shown, the pull rod 26 is rigidly connected with the movable valve member 9d via the body member 23, the housing 20a of the temperature feeler, and the transmission member 10, the distance between the two movable valve members 9d and 11d is decreased. It should be readily apparent that, as a result, the cross-sectional area of the inlet openings for the valves 9 and 11 becomes smaller and, if desired, the movable valve members 9d and 11d can also be pressed against their corresponding valve seats 9a and 11a so that the supply of hot water as well as cold water can be shut-off in a manner as shown in FIGURE 1.

In order to control the temperature of the outgoing mixed water, the nut member 18 is provided with a shoulder 18a against which lies a ring member 31. The ring member 31 is provided at one side with a projection 31a which extends into an axially parallel slot 32 arranged in the inner housing sleeve portion 2a. By means of these elements 31 and 32 it is possible to prevent that the ring member 31 will rotate together with the nut 18. Against the ring 31 lies one end of a spring member 33. The opposite end of the spring member 33 lies against a plate or ring member 34 guided on a threaded member 35 which is rigidly connected with a temperature regulating knob 36. The ring member 34 is secured against rotation in the same manner as the ring member 31 previously described. If, now, the temperature regulating knob 36 is for example rotated in one direction, the ring member 34 provided with the internal threading is displaced downwardly, thereby increasing the stress or tension of the spring member 33. As a result, the force with which the spring 33 acts against the ring 31 is increased.

This force works through the pull rod 26 on the entire movable system which, as already explained, comprises the movable valve members 9d and 11d which are adjustable with respect to their spacing from one another, as well as the body member 23, the housing 20a of the temperature feeler and the transmission member 10.

The abutment or counter force for the spring member 33 is formed by the expansion medium 20f of the temperature feeler housing 20a. The described system, movable in the axial direction of the valve housing, assumes a position of rest when the pressure of the spring member 33 is in equilibrium with the pressure with which the control medium acts against the top or upper surface of the plate member 20d. It is thus to be appreciated that by means of the temperature regulating knob 36 it is possible to control or regulate the temperature of the outstreaming water.

If during operation, for example, the temperature of the hot water flowing through the hot water supply pipe 4 decreases, the temperature feeler 20 is cooled so that a portion of the control medium is condensed and the pressure in the temperature feeler is reduced. The result of such is that the entire system movable in the axial direction is downwardly displaced under the influences of the spring member 33 whereby the supply of cold water is throttled and the supply of hot water is increased. A similar result occurs if the pressure of the spring 33 is increased through a corresponding rotation of the knob 36, whereby the temperature of the outstreaming water is increased.

It is here to be mentioned that the entire mixing valve can be constructed and sealed within the outer housing 1. The sleeve-like inner housing 2 which consists of the elements 2a, 2b and 2c are connected together by the valve seats 9a and 11a, respectively. It is to be appreciated that all of the remaining constructional elements can be mounted on the inner housing 2, while the outer housing 1 only serves as a jacket or covering. Under certain circumstances it is necessary to secure the inner housing 2 against rotation. This can, for example, be achieved by a setscrew 40, which is shown at the lower end of the illustrated embodiment.

The exactness of the temperature of the outstreaming water depends to a large or critical extent upon which resistance opposes the control force of the entire system movable in the axial direction. It is to be noted, that in the illustrated embodiment the described movable system is provided with only two sealing O-rings, that is to say, with the O-ring 9g and the corresponding O-ring 11g for the valve construction 9 and 11, respectively, which sealing rings are in contact with the outer wall of the inner housing 2. These two O-rings 9g and 11g, on the one hand, produce a sealing of the hot water chamber 7a and the cold water chamber 6a, respectively, and on the other hand, provide the upport for the movable system.

Prior to inserting the inner housing 2 into the outer housing 1 the upper closure member 41 can be threadably connected with the inner housing portion 2a. After insertion of the inner housing unit 2 there is undertaken a fine adjustment of the temperature of the outgoing water by means of the fine adjustment or compensation spring 21b, whereafter the lower closure member 43 can be threadably attached, as clearly shown in the drawing. It can readily be seen from the drawing that it is also possible to undertake installation of the inner sleeve housing 2 after mounting of the outer housing 1. This feature is of particular importance whenever repair of the mixing valve becomes necessary, since the inner housing 2, manufactured as a prefabricated unit, can be exchanged for the correspondingly damaged unit without dismounting of the entire valve structure.

It has already been mentioned that the preciseness with which the mixing valve operates is also dependent upon the resistance which opposes the movement of the movable system. It is especially to be noted that the provided guiding elements or support elements for the movable system do not develop any forces which are a function of the momentary position of the movable system. It is conceivable however, that with larger stroke or displacement thereof, the O-rings 9g and 11g, which roll on the inner wall of the inner housing portions 2a and 2c, respectively, transmit a force to the movable system which attempts to move this system back into its original or starting position. In order to avoid influences of this nature and caused by such O-rings, it is possible to provide a construction of the type shown in detail in FIGURE 2, wherein like reference numerals have been employed for the same elements depicted in FIGURE 1.

In FIGURE 2 there is shown an enlarged view of the left-hand portion of the sealing ring 9g shown in the embodiment of FIG. 1. As can be clearly seen from FIGURE 2, the portion of the inner housing 2c which is in contact with one side of the O-ring 9g is sloped or tapered, as generally indicated by reference numeral 45. In a similar manner the bearing or contact surface of the movable valve member 9d which is in contact with the other side of the O-ring 9g is also tapered or sloped, as generally indicated by reference numeral 46. The two conical shaped or tapered contact surfaces 45 and 46 for the sealing ring 9g form a ring shaped or annular slit which convergingly tapers or narrows in the direction of the developed pressure against which sealing is to take place, that is to say, in the direction of the arrow 47. In such type of an arrangement of the sealing element or O-ring 9g, the latter will be rolled during axial displacement of the valve member 9d of the described movable system, without there resulting any forces in the direction of movement. The direction of movement of the system is depicted in FIGURE 2 by the arrow 48. Moreover, tests undertaken with the arrangement of FIGURE 2 have not only shown that there results a practically resistance free movement of the movable system in the direction of arrow 48, but additionally, also a faultless or perfect sealing in the present case of the hot water chamber 7a.

The mixing valve described with reference to FIGURES 1 and 2 permits for an exact temperature regulation of the delivered mixed water, whereby in particular foreign temperature influences, as for example, caused by the incoming hot water are avoided as previously described. Additionally, the mixing valve construction of the present invention ensures that the cold water and hot water are thoroughly commingled before they influence the temperature feeler. As a result, the temperature of the mixed water, even with very small quantities of water, permits for a faultless operation of the mixing valve.

It is to be understood and appreciated that a number of changes and modifications can be made without departing from the spirit and scope of the present invention. Thus, for example, the flexible bellows can be replaced by a diaphragm, whereby the rod 20e lies against the upper surface of this diaphragm. Additionally, the described spatial arrangement of the individual zones and compartments can be changed with respect to one another. Finally, the pressure transmitting rod 20e can be replaced by an abutment or support member arranged in the middle of the mixing valve, for example, connected with the walls of the inner housing, although a construction of this type makes impossible or very difficult a sensitive regulation of the outgoing water. It should be quite apparent from the foregoing that the mixing valve assembly permits for a very exacting and reliable commingling of fluid mediums, such as hot and cold water for example.

Having thus described the present invention what is desired to be secured by United States Letters Patent, is:

1. A fluid mixing valve for automatically controlling the temperature of outgoing mixed fluid, a hollow housing means, wall means within said housing means for establishing therein a first fluid chamber, a second fluid chamber, and a mixing compartment disposed between said first and second chambers, first and second fluid inlets communicating respectively with said first and second fluid chambers, temperature responsive control means disposed within said mixing compartment, transfer chamber means within said housing means for transferring fluid from said first fluid chamber toward said second fluid chamber, said second fluid chamber and said transfer chamber communicating with said mixing compartment to one side of said temperature responsive means, said first fluid chamber communicating with said mixing compartment only through said transfer chamber whereby fluid passing from said first and second fluid chambers mixes before contacting said temperature responsive control means, first adjustable valve means for selectively controlling fluid transfer between said second fluid chamber and said mixing compartment, second adjustable valve means for selectively controlling said fluid transfer from said first fluid chamber to said transfer chamber, means coupling said first and second valve means with said temperature responsive control means for automatic adjustment of said valve means in accordance with the temperatures sensed by said temperature responsive control means, and a fluid outlet communicating with said mixing compartment.

2. A fluid mixing valve as defined in claim 1 wherein said wall means, said valve means, said temperature responsive means, and said means coupling said first and second valve means with said temperature responsive control means are joined together as a unit, wherein said housing means has an open end and a removable closure for said open end, and wherein said unit is dimensioned for sliding movement into and out of said housing means through said open end thereof.

3. In a mixing valve for mixing together fluid mediums, as for example hot and cold water and automatically controlling the temperature of the outgoing mixed water, the combination of: wall means defining at least a hot water chamber, a cold water chamber and a mixing chamber between said hot and cold water chambers, individual valve means spaced from one another arranged in said hot water chamber and said cold water chamber for controlling the delivery of hot and cold water to said mixing chamber, temperature responsive means arranged in said mixing chamber, said temperature responsive means being connected to cooperate with said valve means to control the latter, support means for said temperature responsive means, said wall means being provided with openings, said valve means and said openings being positioned to admit said hot and cold water into said mixing chamber at a point to one side of said temperature responsive means and such that at least a portion of said support means for said temperature responsive means is passed and contacted by the mixed water, said hot water chamber, cold water chamber and mixing chamber being coaxially arranged, said wall means being defined by a hollow outer housing and a hollow sleeve member mounted within said outer housing, said sleeve member being spaced from said outer housing to provide an annular chamber directing water from one of the hot and cold water chambers toward the other and communicating said mixing chamber with said one chamber whereby said hot and cold water are fed into said mixing chamber for movement within said mixing chamber in the same direction and toward said temperature responsive means.

4. In a mixing valve for mixing together fluid mediums, as for example hot and cold water and automatically controlling the temperature of the outgoing mixed water according to claim 3; wherein each of said valve means includes a valve seat and a movable valve member, means displaceably connecting together said movable valve members and said temperature responsive means, one of said valve mean controlling feed of one of said fluid mediums from said one chamber through said annular chamber and said openings into said mixing chamber, the other of said valve means controlling feed of the other of said fluid mediums directly into said mixing chamber.

5. In a mixing valve for mixing together fluid mediums, as for example hot and cold water and automatically controlling the temperature of the outgoing mixed water according to claim 4; wherein said openings into said mixing chamber and said other valve means are located at one end of said mixing chamber and in close proximity to one another.

6. In a mixing valve for mixing together fluid mediums, as for example hot and cold water and automatically controlling the temperature of the outgoing mixed water according to claim 4; wherein said annular chamber feeds a supply of cold water in the direction of said other valve means controlling the supply of hot water from said hot water chamber into said mixing chamber.

7. In a mixing valve for mixing together fluid mediums, as for example hot and cold water and automatically controlling the temperature of the outgoing mixed water according to claim 4; wherein said support means extends from said temperature responsive means in the direction of said other valve means such that it is contacted by mixed water.

8. In a mixing valve for mixing together fluid mediums, as for example hot and cold water and automatically controlling the temperature of the outgoing mixed water according to claim 4; wherein said movable valve members are positioned relative to their valve seats so as to operate in an opposite sense from one another; and means cooperating with said valve means to regulate the distance therebetween for controlling the total quantity of mixed water delivered by said mixing valve.

9. In a mixing valve for mixing together fluid mediums, as for example hot and cold water and automatically controlling the temperature of the outgoing mixed water according to claim 4; wherein said temperature responsive means includes a control medium, spring means arranged within said hollow outer housing counteracting the pressure of said control medium, means for adjusting the tension of said spring means to control the temperature of said outgoing mixed water.

10. In a mixing valve for mixing together fluid mediums, as for example hot and cold water and automatically controlling the temperature of the outgoing mixed water according to claim 9; said temperature responsive means includes an internally mounted plate member acted upon by said control medium, a rod member attached to said plate member, and an abutment member against which said rod member bears.

11. In a mixing valve for mixing together fluid mediums, as for example hot and cold water and automatically controlling the temperature of the outgoing mixed water according to claim 4; wherein sealing means are provided for supporting at least said temperature responsive means and said movable valve members.

12. In a mixing valve for mixing together fluid mediums, as for example hot and cold water and automatically controlling the temperature of the outgoing mixed water according to claim 11; wherein said sealing means are a pair of O-rings.

13. In a mixing valve for mixing together fluid mediums, as for example hot and cold water and automatically controlling the temperature of the outgoing mixed water according to claim 12; where an O-ring is carried by each of said movable valve members at a point remote from its associated valve seat.

14. In a mixing valve for mixing together fluid mediums, as for example hot and cold water and automatically controlling the temperature of the outgoing mixed water according to claim 13; where said respective O-ring is supported between a wall of its associated movable valve member and an opposed inner wall of said hollow sleeve member.

15. In a mixing valve for mixing together fluid mediums, as for example hot and cold water and automatically controlling the temperature of the outgoing mixed water according to claim 14; where said wall of said valve member and inner wall of said hollow sleeve member supporting said O-ring are convergingly tapered in the direction of sealing.

References Cited in the file of this patent

UNITED STATES PATENTS

| | | |
|---|---|---|
| 3,000,571 | Fresson | Sept. 19, 1961 |
| 3,028,094 | Burhop | Apr. 3, 1962 |

FOREIGN PATENTS

| | | |
|---|---|---|
| 867,126 | Great Britain | May 3, 1961 |
| 973,429 | Germany | Feb. 18, 1960 |